US 6,728,777 B1

(54) METHOD FOR ENGINEERING PATHS FOR MULTICAST TRAFFIC

(75) Inventors: Cheng Yin Lee, Ottawa (CA); Loa Andersson, Slus (SE)

(73) Assignee: Nortel Networks Limited, St. Laurent (CA)

( * ) Notice: Subject to any disclaimer, the term of this patent is extended or adjusted under 35 U.S.C. 154(b) by 645 days.

(21) Appl. No.: 09/585,421

(22) Filed: Jun. 2, 2000

Related U.S. Application Data

(60) Provisional application No. 60/137,509, filed on Jun. 2, 1999.

(51) Int. Cl.[7] ............................................. G06F 15/16
(52) U.S. Cl. ..................................... 709/238; 370/230
(58) Field of Search .................. 709/238, 242; 370/230, 230.1, 238, 351

(56) References Cited

U.S. PATENT DOCUMENTS

| | | | | |
|---|---|---|---|---|
| 5,079,767 A | * | 1/1992 | Perlman ...................... | 370/408 |
| 5,331,637 A | | 7/1994 | Francis et al. ................ | 370/54 |
| 5,687,167 A | * | 11/1997 | Bertin et al. ................. | 370/254 |
| 5,946,316 A | * | 8/1999 | Chen et al. ................... | 370/408 |
| 6,023,730 A | * | 2/2000 | Tani ............................. | 709/231 |
| 6,055,561 A | * | 4/2000 | Feldman et al. ............. | 709/200 |
| 6,205,488 B1 | * | 3/2001 | Casey et al. .................. | 709/238 |
| 6,331,983 B1 | * | 12/2001 | Haggerty et al. ............. | 370/400 |
| 6,337,861 B1 | * | 1/2002 | Rosen ........................... | 370/389 |
| 6,339,595 B1 | * | 1/2002 | Rekhter et al. ............... | 370/392 |
| 6,374,303 B1 | * | 4/2002 | Armitage et al. ............. | 709/242 |
| 6,473,421 B1 | * | 10/2002 | Tappan ......................... | 370/351 |
| 6,542,469 B1 | * | 4/2003 | Kelley et al. ................. | 370/238 |
| 2002/0176370 A1 | * | 11/2002 | Ohba et al. .................. | 370/252 |

FOREIGN PATENT DOCUMENTS

| CA | WO 00/76125 A1 | * | 12/2000 | ........... H04L/12/18 |
|---|---|---|---|---|
| CA | 1 079570 A2 | * | 2/2003 | ........... H04L/12/56 |

OTHER PUBLICATIONS

Nortel Networks, "IP Traffic Engineering for Carrier Networks: Using Contraint–Based Routing to Delivery New Services", 10/99 Nortel Networks, 9 pages.*

Awduche et al, "Requirements for Traffic Engineering Over MPLS" draft–ietf–mpls–traffic–eng–00.txt, 10/99, Network Working Group Internet Draft, Nov. 1998, p. 1–27.*

Vaananen et al., "Framework for Traffic Management in MPLS Networks", draft–vaananen–mpls–tm framework–00.txt, 10/98, Network Working Group Internet Draft, Mar. 1998, 54 pages.*

* cited by examiner

*Primary Examiner*—Bunjob Jaroenchonwanit

(57) ABSTRACT

A method to engineer paths for multicast traffic in an IP network, by directing the control messages to setup multicast trees on engineered paths, is disclosed. The multicast traffic engineering process is separated from the multicast route setup and the resources and the paths for multicast data delivery can be aggregated and independently allocated. Resources are allocated on the same trip when paths are selected and setup, and this prevents data from being forwarded on branches where resources have not been yet allocated. The traffic can be statistically multiplexed enabling the network operators to have control over the topology of the multicast trees and to provide differentiated services in a scalable manner.

15 Claims, 7 Drawing Sheets

METHOD FOR ENGINEERING PATHS FOR MULTICAST TRAFFIC

This application claims benefit of Provisional Application 60/137,509 filed Jun. 2, 1999.

BACKGROUND OF THE INVENTION

1. Field of Invention

The present invention relates to multicast communications in generals; and in particular to a method for engineering paths over IP networks.

2. Related Art

"Network device" is a general term designating a computer linked via a network interface, or to other bridging devices that perform specialized functions in the network such as repeaters, bridges, switches, routers, to name only a few. A repeater is a device that moves the packets from one network segment to another by regenerating, re-timing, and amplifying the electrical signals. A bridge is a device that operates at the link layer and passes packets from one network to another and increases efficiency by filtering packets to reduce the amount of unnecessary packet propagation on each network. A switch is a network device similar in function to a multi-port bridge and includes a plurality of ports for coupling to similar ports in other networks and directing traffic between networks.

Switches and routers are used to cross-connect a group of trunks and for transmitting data packets from source to destination. Each switch/router maintains a table whose entries each include an address and trunk identification number. Each data packet includes a source address, a destination address, and a payload. Upon reception of a packet at a switch, the source address contained in the packet and the identification number of the trunk on which the packet arrived are stored as an entry in the table, unless the table already includes an entry comprising this address and the trunk identification.

A host node initiating a transmission to another node is called the source node. The host node which receives the packet is called the destination node. Thus, a host node may initiate transmission or receive data, whereas a router can only receive and retransmit data. Establishing communications between a single source node and a single destination node is achieved through a process called unicast routing.

Multicasting is defined as a communications process involving one or more senders and receivers, information transmitted by any participant in the multicast is received by every other participant in the multicast. Users connected to the network who are not participants in a particular multicast do not receive the information transmitted by any of the senders and no network components, e.g. switches/routers or trunks, are used unless needed for the multicast. For example, broadcast involving one sender and many receivers is a particular case of multicasting and may include wide-area broadcast, e.g. TV and radio, narrowcast for smaller areas, and conferencing with selected numbers of transmitters and receivers across a wide area.

As exemplary shown in FIG. 1, a plurality of nodes interconnected by trunks are arranged to form a spanning tree. Collectively, the sequences of nodes which interconnect all the member nodes of a particular group form a multicast tree. Conventionally, multicast tree construction is sender based forming the spanning tree around a core node. If host nodes A and D wish to set up a multicast transmission using a previously agreed multicast address "M", a packet containing source address "A" and destination address "M" is transmitted in the network. Entries are added at each node where the packet arrives and then deleted after a defined time interval (maximum) if the entries are not reinforced from hosts A and D. When a host wants to join a multicast transmission, even if it is the first participant, it simply transmits a packet from itself to the "M" address. The packet is broadcasted over the entire spanning tree to all member nodes, and the host continues to send packets to the "M" address with a maximum inter-packet time interval smaller than Maxtime to make sure that at least one of the relevant table entries is not cleared. Other hosts wishing to join the multicast, simply transmit a packet to the "M" address whenever they decide to join.

For performing a multicast conversation in a network, the nodes elect a single node among all the nodes within each network to be the "root" node. Each node has a unique identifier (node ID) and the root may be the node having the lowest node ID. At each node, a "root port" which gives the fewest number of hops from this node to the root is selected, while ports not included within the spanning tree are blocked. At the root, all ports are placed in the forwarding state. For each LAN coupled to more than one node, a "designated" node, typically the one closest to the root, is elected to ensure connectivity to all LANs.

A standard spanning tree procedure has been defined for network bridging devices (bridges, routers, switches) to enable these devices to discover a subset of any topology that forms a loop-free (i.e. tree) and yet connects every pair of local area networks (LANs) within the network (i,e. spanning). The spanning tree procedure results in a network path between any two bridging devices which is updated dynamically in response to network modifications. For example, nodes exchange configuration messages called bridge protocol data units (BPDUs) frames, which allow them to calculate the active topology, or the spanning tree by blocking all redundant links and leaving a single communications path.

When a source node has a data packet to transmit to more than one destination node, such packet may be transmitted using a multicast routing. A delivery process called multicast routing is used to establish multicast communications. As the data packet propagates from router to router, or node to node, the data packet is selectively replicated at certain routers/nodes so that sufficient copies of the data packet are generated and transmitted to each destination node of the multicast group. A path of the multicast tree between two nodes is referred to as a branch. There is only one branch on the multicast tree between any two nodes.

A new branch in a multicast tree is formed by transmitting a JOIN request control packet from the node joining the group to the tree. The multicast tree sends back a JOIN ACKNOWLEDGEMENT control packet in the opposite direction. It is possible to transmit only the JOIN control packet and each node not already in the multicast tree, or a non-member node, which transmits the JOIN request is directly attached to the tree. However, the JOIN acknowledgement provides the ability to prevent loops from occurring.

There is a need for selecting paths based on traffic engineering (TE) criteria for multicast traffic and to allow resources to be allocated independent of the multicast path setup process.

SUMMARY OF THE INVENTION

The present invention tries to overcome the disadvantages of the prior art associated with multicast traffic engineering (TE) for IP networks.

In an aspect of the present invention, there is provided a method for engineering paths for multicast traffic in IP networks. The method comprises the steps of defining a forwarding equivalence class (FEC); at an egress label switching router (LSP), detecting a control message matching a defined forwarding equivalence class; obtaining a constraint route in the direction of the root prefix of a multicast tree for the detected control message; for each detected control message, creating a state associated with the forwarding equivalence class and the constraint route; attaching traffic engineering (TE) parameters containing the forwarding state information to the detected control message; allocating resources; and forwarding the detected control message to a specified destination.

According to the invention, a label is associated with a unicast route/prefix and packets sent to that destination can be aggregated by associating them with the label. Since multicast routes are not aggregatable in general, associating a label with a multicast route implies per flow/group resources allocation. In essence, this kind of association results in RSVP, (or ATM) specific resources allocation and allows to satisfy per flow quality of service (QOS) requirements.

The constraint-based multicast path setup (CR-MP) is a scalable and cost effective method for providing multicast routing with differentiated services. It also provides for a seamless operation of IP and traffic engineered/MPLS networks.

The "Summary of the Invention" does not necessarily disclose all the features essential for defining the invention. The invention may reside in a sub-combination of the disclosed features.

BRIEF DESCRIPTION OF THE DRAWINGS

The invention will be now explained by way of example only and with reference to the following drawings.

Figure 1:
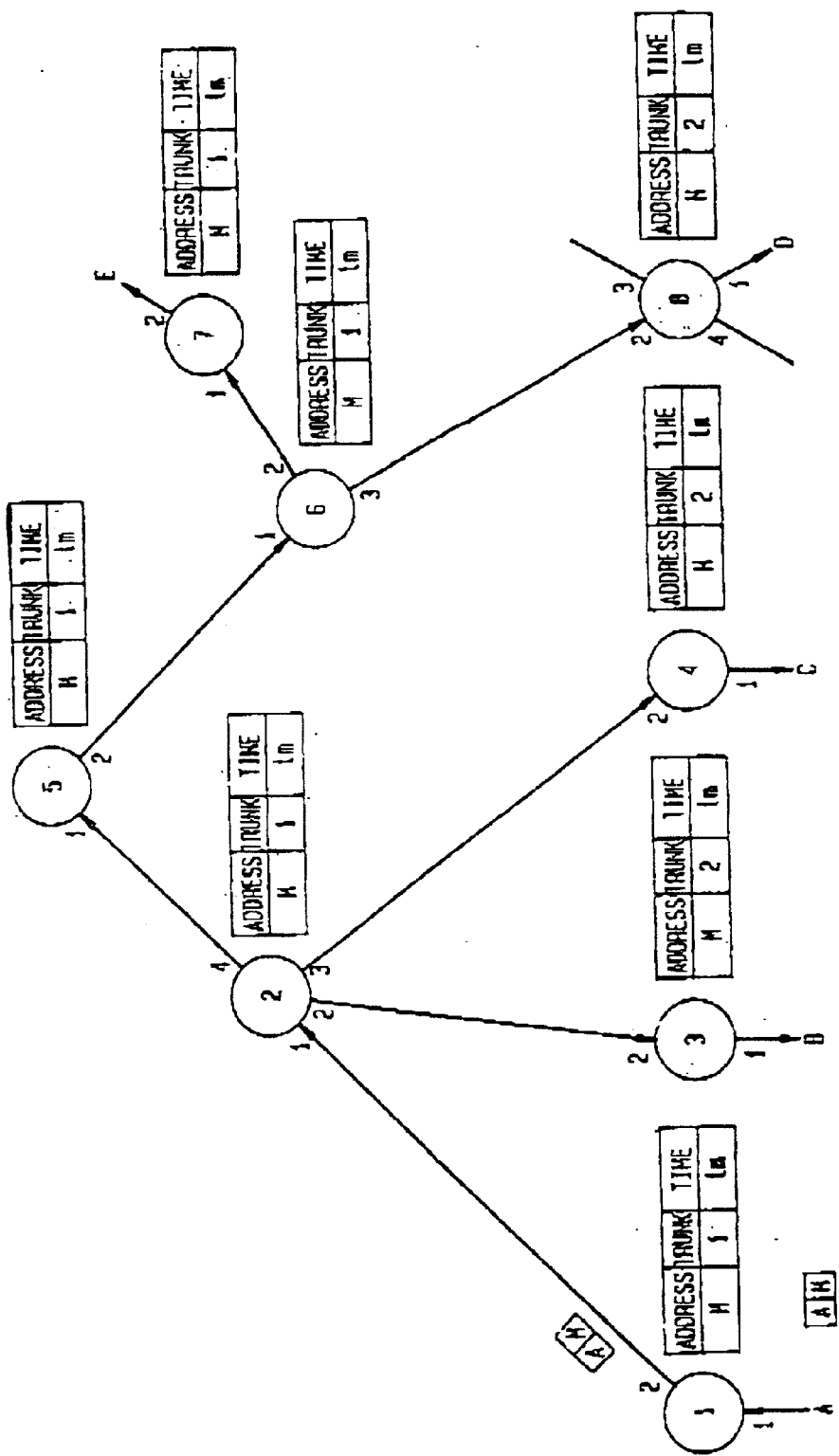
FIG. 1 illustrates a packet switching network for multicast routing.

Similar references are used in different figures to denote similar components.

DETAILED DESCRIPTION OF THE PREFERRED EMBODIMENT

The following description is of a preferred embodiment by way of example only and without limitation to combination of features necessary for carrying the invention into effect.

In general, the traffic in a network is engineered to traverse certain paths so as to utilize resources in a more optimal manner, while at the same time improving the level of service that can be offered. In conventional IP routing, traffic may be engineered to use a path by configuring preferred links towards destination with a lower metric. Since the forwarding is based on the destination address only, the traffic cannot be engineered based on other attributes, or parameters which maybe useful for traffic engineering (TE) purposes such as the source address or the requested service type. In contrast, MPLS networks allow traffic to be forwarded based on attributes, also known as forwarding equivalence class (FEC), in addition to the destination address. This provides a versatile and convenient syntax for traffic engineering (TE) purposes.

The method according to the invention provides a routing mechanism applicable to multicast routing protocols (MRPs) such as PIM-SM, CBT, BGMP, Express or Simple Multicast, which will be called 'control driven' which is different from the 'data driven' or flood and prune protocols like the Distance-Vector Multicast Routing Protocol (DVMRP) or PIM-DM. This method also assumes a multicast group/tree having a common service level requirement. It is possible to meet this requirement even for heterogeneous receivers by layer encoding data in different multicast groups or other variation of layer encoding.

The MPLS concepts used in this disclosure are the FEC, the explicit route object (ERO), the resource allocation, and the path selection which have been already defined in a MPLS environment. Paths are setup using MPLS functionality so that packets are forwarded along the engineered paths instead of being conventionally routed. A path may be manually configured, or a Constraint Based Routing (CBR) process may be used to obtain a path that meets the traffic requirements. Such a path can then be setup as a constraint route in MPLS using the constraint routing label switched protocol (CR-LDP), or the reservation protocol (RSVP) control messages.

Suppose, a control driven multicast routing protocol (MRP) sends a control message, e.g. a JOIN request, to graft a node to a multicast distribution tree. Since the JOIN request is forwarded based on unicast routes, if the conventional routing table is used, the multicast routes setup will be based on conventional routes. If the control message is sent via paths computed, or statically configured in advance, the control messages are forwarded by a TE entity on a constraint path.

For a router to process a control message, the control message should contain a Router Alert option. In such a case, the control message is identified at the egress router by its FEC. Based on the FEC, the TE entity can derive the path the control message should take and allocate resources as specified.

A multicast routing protocol (MRP) sets up the forwarding states on the ports/interface where the control message is received. To allow the establishment of multicast forwarding states based on constraint (unicast) routes, the multicast routing protocols (MRPs) which verifies the Reverse Path Forwarding (RPF) must be turned off, or be able to obtain the 'constraint' RPF via a Constraint Based Routing (CBR)

API. If there is a loop, the multicast routing protocol (MRP) should not create forwarding states for the group on the port where the control message is received.

For example, to send a JOIN request on an engineered path such as extending CR-LDP or TE-RSVP, or to send and merge JOINs for the multicast tree associated with a label implies changing the multicast routing protocol (MRP) to send the JOIN along the constraint route. This operation require multicast routing protocol (MRP) functionalities to be present in MPLS. Alternatively, MPLS functionalities have to be incorporated into multicast routing protocols (MRPs).

The invention uses MPLS labels and explicit route object (ERO) to cause engineered paths to be selected, but data are forwarded using multicast routing. It does not require MPLS, or multicast routing protocols (MRPs) to be merged. Such merger may increase the complexity of multicast traffic engineering (TE) while not providing any means of aggregating multicast traffic engineering.

The conventional approaches require traffic to be engineered for each group/tree since multicast labels/routes are most likely to be not aggregatable. Each group must be assigned a different label.

In contrast, the invention allows a network provider to aggregate the engineered path towards a root prefix since resource allocation and path selection can be independent of the setup of forwarding states/routes. The root prefix may be a source node, a subnet, or a domain. Multicast traffic in the backbone network can then be provisioned in a more scalable manner and statistically multiplexed on the (aggregated) engineered paths.

At the Egress Router/Node

At any egress router/node, or any router where multicast data exits the network, the IP fields of interest in the control message, referred to as FEC, and the associated path selection mechanisms are defined in a Traffic Configuration Table. The FECs correlate to the control messages, e.g., destination=(root prefix)/(target-node) address, CoS= codepoint. The path selection mechanisms can be static (based on a table, or a Constraint Based Routing (CBR) table), or a dynamic path selection algorithm. The resources required for the FEC can be statically configured at the egress router, or may be obtain from other entities.

Figure 2:
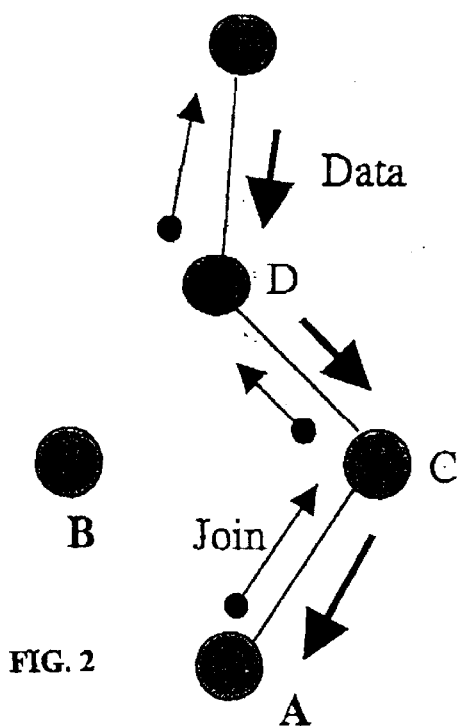
FIG. 2 illustrates how control messages and data are directed in a multicast tree.

FIG. 2 illustrates a branch of a core-based multicast tree for communications between an egress node A and the ROOT node. Initially, traffic with expedite forwarding (EF) class of service (CoS) requirement (CoS=EF), is directed along the path using nodes [A-B-D-ROOT]. Suppose the network decides to re-route the traffic to use node C. A JOIN request control packet is sent from node C to ROOT.

At the egress node A, the TE entity including a Control Message Classifier identifies each control message, classifies the control messages according to the forwarding equivalence class (FEC), and associates the control message to a desired path and the required traffic engineering (TE) parameters. It is to be noted that all egress nodes have consistent TE information and constraint route, or function for members who join the same group.

Figure 3:
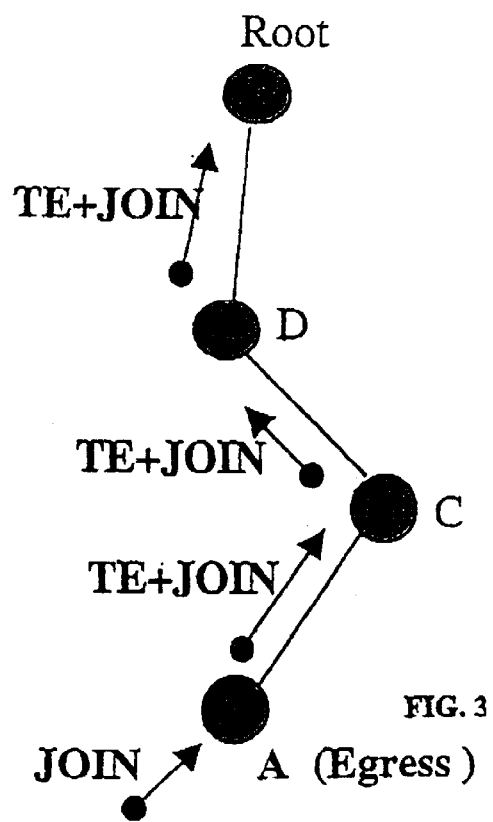
FIG. 3 illustrates how control messages are directed from an egress node in a multicast tree according to the invention.

As illustrated in FIG. 3, the TE information is used by the egress node A to compute the best possible route and the TE parameters, e.g. used bandwidth, when forwarding the JOIN request control packet along the constraint route.

The TE parameters are attached to the control message by the multicast routing protocol (MRP) to create forwarding states (TE+JOIN) for all nodes along the desired communications path. Resources are then allocated for all links transmitting data in one direction and forwarding control messages in the opposite direction.

Figure 4:
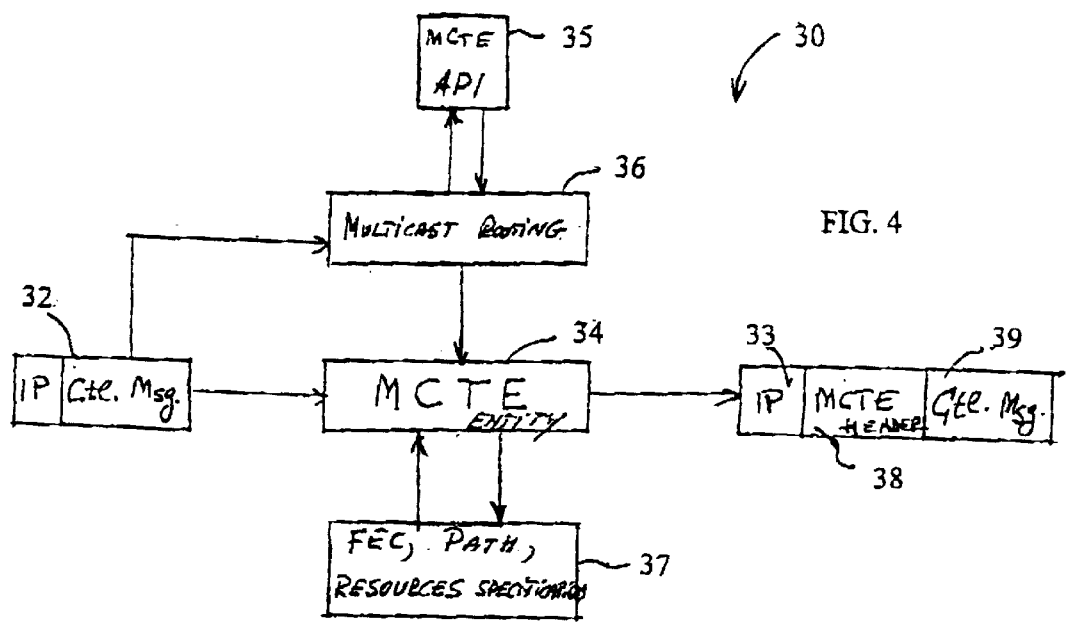
FIG. 4 is a high level block diagram illustrating the passage of control messages In an egress router/node and the packet header assembly at an egress router/node, according to the invention.

FIG. 4 is a high level block diagram illustrating the passage of control messages in an egress router/node 30 and the packet header assembly. A control message 32 arriving at the egress router 30 is processed by the appropriate multicast routing protocol (MRP) 36 to setup the multicast forwarding state.

If the control message matches a defined FEC, the control message is diverted to the MCTE entity 34. How the outgoing control message is diverted to the MCTE entity 34 is implementation dependent. The MCTE entity 34 calls an API 35 provided by the MRP 36 to find out whether the control message 32 is a path setup (JOIN), a path teardown (LEAVE) message, or a maintenance message. If A is a path setup, the resources specified in the Traffic Configuration Table 37 are allocated. If it is a path teardown message, the resources are released. If it is a maintenance control message, the control message is forwarded "as is" by the multicast routing protocol to intermediate routers as known in the art without any MCTE header.

If there is a similar forwarding state existing at the egress router/node, the control message is discarded. Otherwise, the multicast routing protocol (MRP) calls the API 35 provided by the Multicast Traffic Engineering (MCTE) entity 34 to get the next hop to the root.

The MCTE entity 34 obtains a) the route from the conventional routing protocol (MRP) 36 if no path or path selection mechanism is specified in the Traffic Configuration Table 37; or obtains b) the manually configured explicit route in the Traffic Configuration Table 37; or obtains c) the explicit routes via a constraint-based routing (CBR) process, or d) invokes the path selection algorithm, specified in the Traffic Configuration Table 37. It is to be noted that the routes in (a) to (c) are based on the network topology, whereas route (d) may take into account the tree topology in the computation of routes.

The MCTE entity 34 stores the route(s) obtained or computed for a particular FEC, and uses these routes when attaching a MCTE header 38 to the control message.

The form of the API is represented as <get_MCTE_ next_hop(Target-Node, Group)>, where the Target-Node is a mandatory value. The value of Target-Node is in the form of an IP address. Group is not required for (a)–(c) and optional for (d). The return value is from the next hop to the Target-Node.

The form of the API provided by the path selection algorithm in (d) above is represented as get_MCTE_route (Target-Node, Group, Type-of-Metric), where the Target-Node is a mandatory value, and the other values are optional. The value of Target-Node is in the form of an IP address. The return value is a list of explicit mute(s). "Group" represent an added level of granularity by which network administrators can base their traffic engineering (TE) decisions, e.g. it allows per group/flow traffic engineering(TE). Finally, the Type-of-Metric value correlates to different types of metrics used to distinguish one path from another. The default value is (1), which correlates to hop count. Other defined values consist of (2) bandwidth, (4) delay, (8) fault. In cases where the underlying algorithm <get_MCTE_route>does not support metrics other than hop count, this field is ignored, The Type-of-Metric is specified with the path selection algorithm in the Traffic Configuration Table, The MCTE header 38 is placed between the IP header 33 and the control message 39. Resources as specified in the Traffic Configuration Table 37 are allocated or released before the MCTE message is forwarded to the next hop, and returned by the path selection mechanism. If it is either a path setup or a path teardown message, the MCTE entity 34 attaches a MCTE header 38 containing the FEC, the constraint routes provided by the path selection mechanism, the resources required e.g. traffic parameters, service level, and the protocol ID of the control message. To allow other routers to process this MCTE message which includes the control message 39, the packet will be labeled with Router Alert and the control message is forwarded towards the root node.

Figure 5:
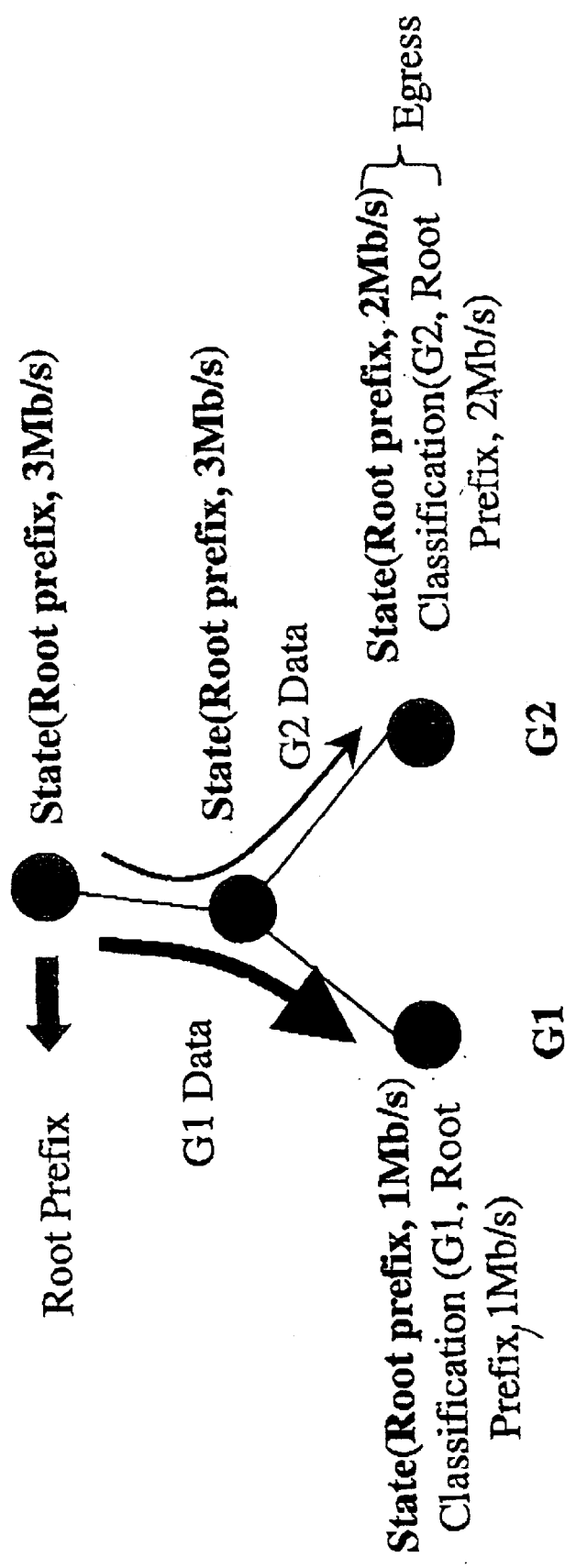
FIG. 5 illustrates per root prefix resource allocation process for distributing data in a multicast tree, according to the invention.

The header of the data packets flowing at an intermediate node C contains the resources allocated per root prefix [Root prefix, nMbis], as shown in FIG. 5. The data packets are forwarded to the egress nodes D, E, for groups G1 and G2 according to their classification which includes in this example <group address; Root prefix; resources allocated>.

The method of traffic engineering according to the invention is flexible since it provides for resources allocation either per each traffic class of service (CoS), or in an aggregated format per Root prefix. This method is capable to engineer traffic with various multicast TE requirements.

Figure 6:
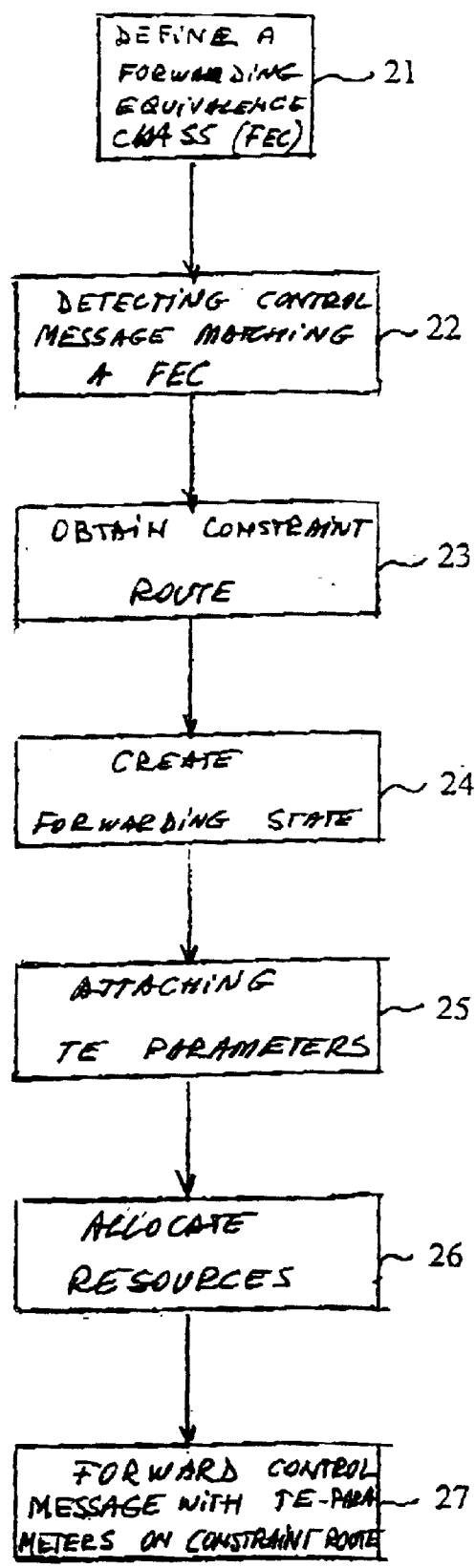
FIG. 6 is a flow chart illustrating the method of directing control messages from an egress node to the multicast tree, according to the invention.

FIG. 6 is a flow chart illustrating the method of directing control messages from an egress node to the multicast tree according to the invention. At step 21, the forwarding equivalence classes (FECs) are defined for the multicast tree. A control message matching a FEC is detected at an egress label switched router (LSR), at step 22. The LSR obtains a constraint route in the direction of the root prefix, step 23, creates a forwarding state for the received control message, step 24, and attaches the traffic engineering (TE) parameters containing the state information to the control message, step 25. At step 26 resources are allocated and finally the control message is forwarded to the next hop at step 27.

At the Intermediate Router/Nodes

Figure 8:
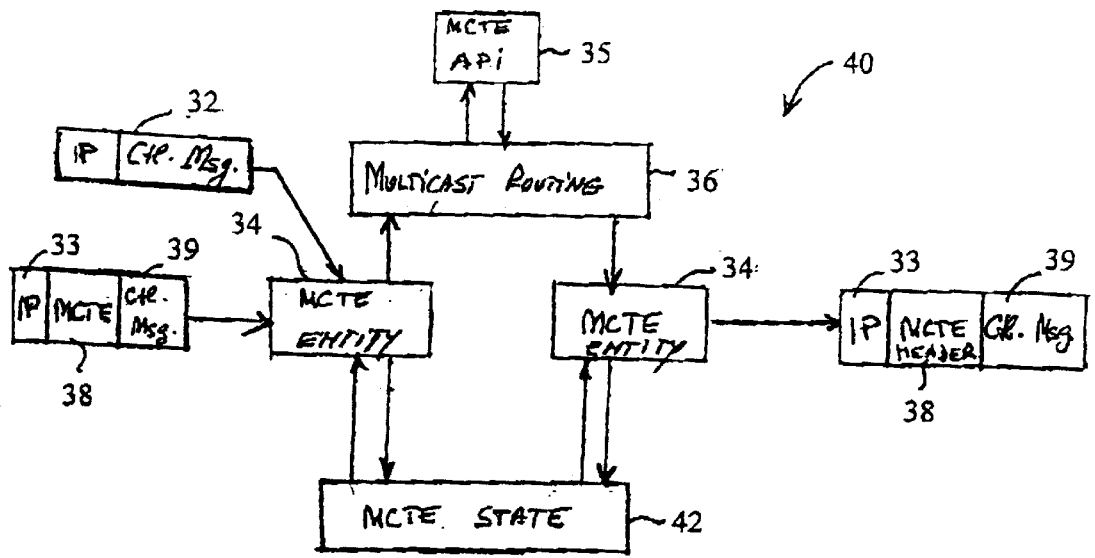
FIG. 8 is a high level block diagram illustrating the passage of control messages in an intermediate router/node and the packet header assembly at an intermediate router according to the invention.
Figures 7, 8:
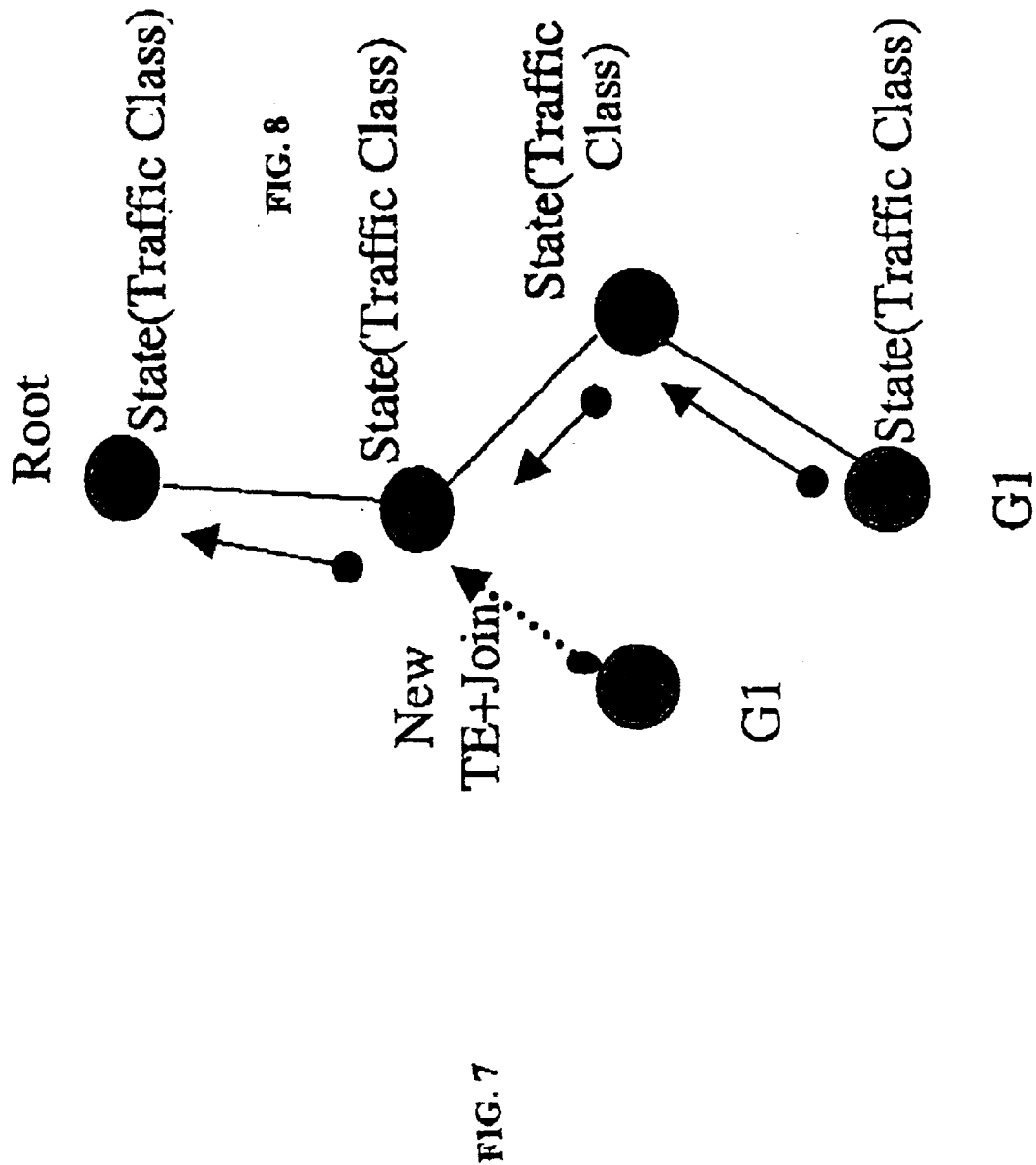
FIG. 7 illustrates per traffic class resource allocation process in a multicast tree according to the invention.

FIG. 7 illustrates control messages are directed from an intermediate node in a multicast tree according to the invention. At intermediate node C, after MRP has created forwarding states for all nodes in the multicast tree for Group-1 (G1), the TE entity allocates resources for links receiving the data, and forwards the control messages (TE+JOIN) in the opposite direction using the information contained in the TE message which specifies the traffic class of service (CoS). Where there is an existing forwarding state and resources allocated, the node will not re-allocate resources for a new (TE+JOIN) message received (dotted line) from a new member of Group-1 (G1) since the JOIN request is merged.

FIG. 8 is a high level block diagram illustrating the passage of control messages in an egress router/node 40 and the packet header assembly at an intermediate router. When the next hop, or other intermediate node receives a packet 32 with a Router Alert, the packet 32 is extracted from the forwarding path and directed to the MCTE entity 34. Since the FEC for this control message 32 matches a MCTE state created earlier, the control message 32 is diverted to the MCTE entity 34. The MCTE entity 34 allocates, or releases the resources requested in the MCTE header 38 and creates a transient state 42 for the MCTE message (MCTE state). Depending on the protocol ID in the MCTE header 38, the appropriate multicast routing protocol (MRP) 36 is then invoked.

The MRP 36 creates the forwarding state for the group, and forwards the control message 32 towards the root. The MCTE entity places the corresponding MCTE header 38' on the control message 32 and forwards the message to the next hop obtained from an MCTE/API 35. The transient MCTE state is removed at this point.

The FEC is only configured at the egress routers, while intermediate routers are informed of the FEC by previous hops. Similarly, the explicit or constraint route is only configured, or computed at the egress router. The next hop and other intermediate nodes learn of the explicit routes via the constraint route list propagated from the egress router to the tree.

The method according to the invention, allows different path selection algorithms to be used, depending on the FEC and path selection mechanism association. Paths can be configured, computed, discovered or obtained through other means.

A path selection mechanism will return the constraint routes allocated for the group address, the root of multicast tree will be released, when the multicast ends.

Applications a) A network operator may define an explicit route [Rx, Ry, Rz] towards a domain with the prefix (47.1.2.0) for multicast traffic. Any member joining a group where the root address has the prefix (47.1.2.0) will have data delivered via the explicit route [Rz, Ry, Rx] and flowing in a direction opposite to the control message. The explicit route may be a Loose Source Route, or a route calculated by an algorithm e.g. an Internal Gateway Protocol (IGP) which can provide constraint based routes.

Figure 9:
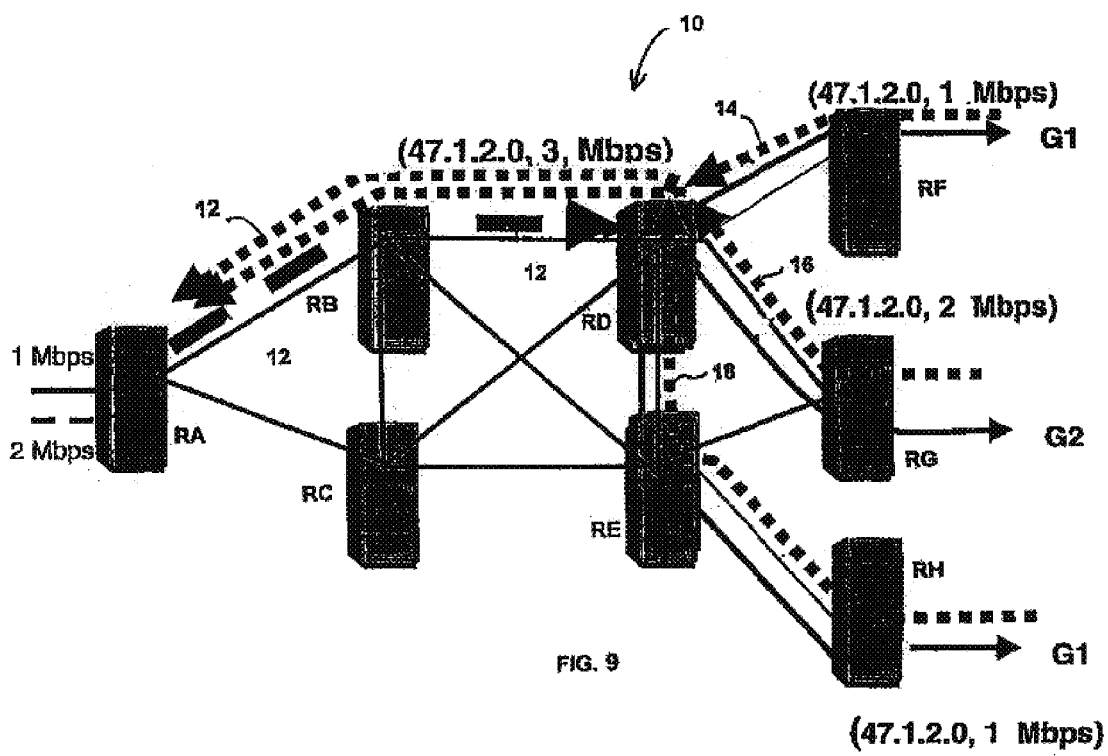
FIG. 9 illustrates the merging of resources allocation which makes a more efficient use of resources than the merging flows since it allows for resources allocation states to be aggregated.

FIG. 9 illustrates the merging of resources allocation which makes a more efficient use of resources than the merging flows since it allows for resources allocation states to be aggregated. The label at node RD includes the IP address of the node and 3 Mbps as the stream for G1 has 1 Mbps, and the stream for G2 has 2 Mbps. This prevents packets from flowing down branches with no members.

Path setup along links 12, 14, 16, 18, may be steered via or only on multicast capable nodes (RA, RD, RE). A non-multicast capable node (RB) will only forward the path setup message without processing it. (A non-multicast capable node can be a member of the Group). When the control packet reaches back the source node RA, node RA sets up a tunnel/LSP to propagate the data to the closest multicast capable node RD located downstream node RB.

Two or more streams may be merged into one LSP provided there is a high probability the groups are homogenous and include a large number of common members. This can reduce the per flow resource allocation states, but requires to filter the stream at the edge nodes by removing the label and using the Internet protocol (IP) address to forward data to recipients. By merging CoS paths less reservation states are used and less bandwidth wasted. Filtering the packets from non-member groups at the edge is based on the IP address and may require extensive processing depending on the number of packets to be filtered at the edge of network 10.

The source node RA may indicate that the video stream has to be replicated a number of times equal to the number of receiving nodes. In addition to the bandwidth requirements, network 10 has to be informed about the amount of replications required and the number of receiving nodes, The bandwidth and the number of receiving nodes is defined by the service level agreement (SLA) requested by the customer. To ensure that the bandwidth used does not exceed the available bandwidth, an access policy must be in place. To control the number of egress points used, egress routers do not allow path setup to proceed if the number of egress points requested is higher than the available egress points. If bandwidth, or egress points are not available, the egress node may disallow the path setup.

It is worth noting that the explicit route can be the desired path from a root node to a member node, instead of the reverse path from member node to the root.

b) In another example, an additional field of interest in the FEC, or in the class of service (CoS) may be defined. This allows a network operator, to engineer paths or/and provision resources for traffic requiring Expedited Forwarding [EF] or Assured Forwarding [AF].

c) To decrease fanout, egress routers containing multicast data traffic can obtain the constraint routes towards the root of the tree and construct the tree along these paths instead. These routes can be statically configured or provided by an algorithm which takes into account fanout in route computation.

d) A load balancing algorithm can provide an alternative path that a control message can take depending on the service level requirement of the group and the current utilization of the equal cost paths.

e) Policy routing may provide for different paths to be defined for different groups.

According to the invention, traffic engineering (TE) mechanism for multicast routing, including TE functionalities in the MPLS entity, are used to decide where to forward a control message of the multicast routing protocols (MRPs) based on different TE requirements, and how to allocate resources. The multicast traffic engineering process is separated from the multicast route setup. The resources and the paths for multicast data delivery can be aggregated and independently allocated. Resources are allocated on the same trip when paths are selected and setup and this prevents data from being forwarded on branches where resources have not been yet allocated. The traffic can be statistically multiplexed enabling the network operators to have control over the topology of the multicast trees and to provide differentiated services in a scalable manner.

The multicast TE mechanism allows Internet service providers (ISPS) to define particular FECs for their network; the resources required to receive traffic from a particular root prefix; to decrease fanouts at a node by limiting the number paths towards this node and establishing constraint paths to carry multicast traffic; to experiment with heuristics algorithms how to better engineer multicast trees; or to use a function to dynamically compute suitable paths based on current or predicted network resources. All these additional network, or content provider specific functions to engineer traffic can be developed independently of the conventional multicast traffic engineering scheme.

Numerous modifications, variations, and adaptations may be made to the particular embodiments of the invention without departing from the scope of the invention which is defined In the claims.

We claim:

1. A method of engineering paths for multicast traffic in an IP network, comprising the steps of:
   a) defining a forwarding equivalence class for a control message of a multicast routing protocol at an egress label switching router;
   b) detecting, at said egress label switching router, said control message, which matches said defined forwarding equivalence class;
   c) obtaining a constraint route in the direction of the root prefix of a multicast tree for said detected control message at an egress label switching router;
   d) for each said detected control message, creating a forwarding state associated with said forwarding equivalence class and said constraint route by using the multicast routine protocol;
   e) attaching traffic engineering (TE) parameters containing said forwarding state information to said detected control message;
   f) allocating resources along said constraint route; and
   g) forwarding said detected control message to which said TE parameters have been attached, to said root along said route.

2. The method of claim 1, further comprising the step of comparing said forwarding state created at step (d) with stored forwarding states to determine if the created forwarding state is identical with the stored forwarding state, and the step of discarding said control message when it is determined that said created forwarding state is identical with the stored forwarding state.

3. The method of claim 1, wherein the step of obtaining a constraint route provides the constraint route based on the network topology.

4. The method of claim 1, wherein the step of obtaining a constraint route provides the constraint route based on the tree topology.

5. The method of claim 1, wherein the resources and the paths for multicast data delivery are aggregated and independently allocated.

6. The method of claim 1, further comprising creating forwarding states on all ports where said control message with said TE parameters are received, except for ports experiencing loop condition.

7. A computer-readable medium containing computer executable instructions including the steps of:
   defining a forwarding equivalence class for a control message of a multicast routing protocol at an egress label switching router;
   detecting, at said egress label switching router, said control message, which matches said defined forwarding equivalence class;
   obtaining a constraint route in the direction of the root prefix of a multicast tree for said detected control message at an egress label switching router;
   for each said detected control message, creating a forwarding state associated with said forwarding equivalence class and said constraint route by using the multicast routine protocol;
   attaching traffic engineering (TE) parameters containing said forwarding state information to said detected control message;
   allocating resources along said constraint route; and
   forwarding said detected control message to which said TE parameters have been attached, to said root along said route.

8. An egress router, comprising:
   means for defining a forwarding equivalence class for a control message of a multicast routing protocol;
   means for detecting a control message contained in a received packet;
   means for obtaining a constraint route in the direction of the root prefix of a multicast tree for a said control message detected by said detecting means, said control message matching said forwarding equivalence class;
   means for creating forwarding states associated with the forwarding equivalence class and the constraint route for each detected control message by using the multicast routing protocol;
   means for attaching traffic engineering (TE) parameters containing the forwarding state information to said detected control message;
   means for allocating resources along said constraint route; and
   means for forwarding said detected control message to which said TE parameters have been attached, to said root along said route.

9. An edge router in a multicast tree, comprising:
a traffic configuration table adapted for:
   storing a forwarding equivalence class correlated to a control message of a multicast routing protocol;
a multicast routing protocol entity (MRP) adapted for:
   setting up a multicast forwarding state for said control message based on a traffic engineering criteria to forward multicast data;
a multicast traffic engineering (MCTE) entity adapted for:
   classifying said control message when said control message matches said forwarding equivalence class; and
   when said control message is classified as a path setup message, performing the following steps of:
      associating said control message to a route and a resource based on said traffic engineering criteria,
      attaching a header to said control message, which includes said forwarding equivalence class and information on said route said and resource, and
      forwarding said control message to a root along said route.

10. The edge router of claim 9, wherein said multicast traffic engineering entity obtains said route from at least one of an explicit route specified in said traffic configuration table, constraint based routing (CRB) element, and a path selection algorithm specified in said traffic configuration table.

11. The edge router of claim 9, wherein said traffic engineering criteria includes a type of service (ToS).

12. The edge router of claim 9, wherein said edge router is in an IP network, and said header is placed with an IP header and said control message.

13. The edge router of claim 9, wherein said multicast traffic engineering entity is further adapted for labeling said control message with Router Alert so that nodes along said route intercepts said control message.

14. The edge router of claim 13, wherein said header includes a protocol ID of said control message such that nodes along said route invokes a multicast routing protocol in response to said protocol ID.

15. The edge router of claim 9, wherein said multicast traffic engineering entity is further adapted for releasing resources, when said control message is classified as a path teardown message.

* * * * *